G. W. LOOMIS,

Assignor, by mesne assignments, to THE GOLD MEDAL SEWING MACHINE CO.

SHUTTLE FOR SEWING MACHINES.

No. 9,923. Reissued Nov. 8, 1881.

Witnesses.
John F. C. Prinkert
Wm. N. Finckel

Inventor.
Geo W. Loomis,
by Crosby & Gregory
Attys.

N. PETERS, Photo-Lithographer, Washington, D. C.

UNITED STATES PATENT OFFICE.

GEORGE W. LOOMIS, OF NEW HAVEN, CONNECTICUT, ASSIGNOR, BY MESNE ASSIGNMENTS, TO THE GOLD MEDAL SEWING MACHINE COMPANY, OF ORANGE, MASSACHUSETTS.

SHUTTLE FOR SEWING-MACHINES.

SPECIFICATION forming part of Reissued Letters Patent No. 9,923, dated November 8, 1881.

Original No. 152,041, dated June 16, 1874. Application for reissue filed September 7, 1881.

*To all whom it may concern:*

Be it known that I, GEORGE W. LOOMIS, of New Haven, in the county of New Haven and State of Connecticut, have invented certain new and useful Improvements pertaining to Sewing-Machine Shuttles, of which the following is a specification, reference being had to the accompanying drawings, where—

Figure 1:
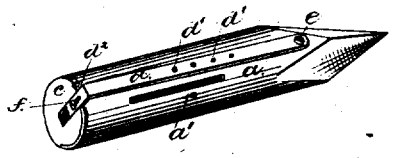
Figure 3:
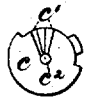
Figure 2:
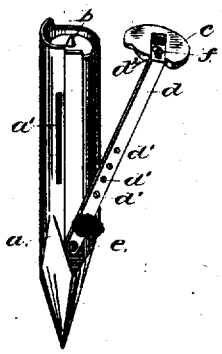

Figure 1 is a perspective view of the shuttle embodying my said improvements closed. Fig. 2 is a view of the same shuttle opened. Fig. 3 is a view of the inner face of the cap.

The shuttle is one of the kind known as a "closed" shuttle in distinction from the open or boat shuttles used in some sewing-machines.

The invention consists in the parts and combinations of parts specified in the claims at the end of this specification.

The body of the shuttle, *a*, is much like the body of any closed shuttle, open at the butt. The bobbin *b* is seen inside in Fig. 2.

The cap *c*, which closes the butt-end, is attached to and carried by the end of the spring-arm *d*, the opposite end of which is pivoted at *e* to the outside of the body of the shuttle, so that this spring-arm, bearing the cap *c*, can be swung to one side, as shown in Fig. 2, to uncover the butt of the shuttle for the removal from or insertion of the bobbin within the shuttle-body.

The arm *d* is a spring, and tends to draw the cap toward that side of the shuttle on which this arm is situated, so that when the cap is swung into position shown in Fig. 1 it springs or snaps into place, engaging the butt-end of the shuttle-body, and being thereby held securely in place.

The inner face of the cap *c* has a groove, *c'*, running from its circumference to its center, the groove diminishing in breadth to the center, forming a guide, which directs the arbor of the bobbin to the center or bearing $c^2$. The thread comes from the bobbin out through the slot *a'*, and gets its tension by being passed through a greater or less number of the holes *d'* in the arm *d*.

The tension can be increased by adjusting the arm *d* toward the body of the shuttle. Such adjustment can be regulated by means of the screw *f*, running through the slot $d^2$ in the arm into the cap. The shape of the butt-end of the shuttle is such that when the cap *c* is swung into place the corners and sides of the shuttle, as a whole, are regular and unbroken.

Heretofore the spring-arm has been provided with a hook to engage a notched part of an independent heel or butt piece having a pin or journal fitted to a hole in the shuttle-body, the said butt-piece requring to be put into and and removed from the butt of the shuttle independently of the movement of the spring-arm.

I claim as my invention—

1. The combination of the body *a* with the perforated spring-arm adjustably connected to the cap, and arranged to operate as set forth.

2. As an improved article of manufacture, a shuttle composed of the open-ended shuttle-body *a*, spring tension-producing arm connected therewith at one end, and butt-closing cap secured to and made movable with the said arm to uncover the open butt of the shuttle, substantially as described.

GEO. W. LOOMIS.

Witnesses:

JOSEPH J. SWEENEY,
M. H. MARLIN.